United States Patent Office 3,300,486
Patented Jan. 24, 1967

3,300,486
ANDROSTANO-PYRAZOLES
Georg Anner and Jaroslav Kalvoda, both of Basel, Switzerland, assignors to Ciba Corporation, New York, N.Y., a corporation of Delaware
No Drawing. Filed June 4, 1964, Ser. No. 372,705
Claims priority, application Switzerland, July 5, 1963, 8,426/63
3 Claims. (Cl. 260—239.5)

The present invention provides a process for the manufacture of new androstano-pyrazoles of the formulae

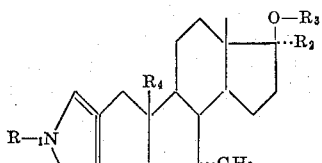

and

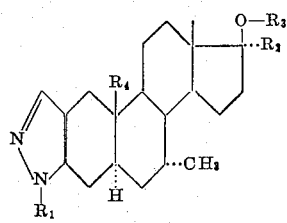

where $R_1$ represents a hydrogen atom or a lower alkyl or aryl radical, $R_2$ a lower aliphatic hydrocarbon radical, $R_3$ a hydrogen atom or an acyl radical and $R_4$ a hydrogen atom or a methyl group and of their salts.

A lower alkyl or aryl radical is, for example, methyl, ethyl, propyl or isopropyl, or a phenyl group which may be unsubstituted or substituted by lower alkyl, lower alkoxy, methylenedioxy, acyloxy, hydroxyl, halogen, trifluoromethyl or amino.

The aliphatic hydrocarbon radical $R_2$ is advantageously a lower alkyl, more especially a methyl, group or, for example, ethyl, propyl, isopropyl, or a lower alkenyl or alkinyl radical, such as vinyl, allyl, methallyl, ethinyl or propargyl.

An acyl radical is, for example, that of an organic carboxylic or sulphonic acid which advantageously contains no more than 18 carbon atoms, e.g. the radical of formic, acetic, propionic, butyric, valeric, trimethylacetic, caproic, undecylenic, cyclohexanecarboxylic, cyclopentylproprionic, phenylacetic, phenoxyacetic, benzoic or furancarboxylic acid or of methanesulfonic, ethanesulfonic, benzenesulfonic or toluenesulfonic acid.

The new compounds possess valuable pharmacological properties. Inter alia they display in the test on rats a very favorable quotient of the anabolic to the androgenic action and may, therefore, be used as anabolics, for example for treating post-infectious or post-operative deficiency symptoms, and for treating a chronic loss of weight, anorexia or osteoporosis.

The new compounds can be manufactured by known methods; advantageously, a compound of the formula

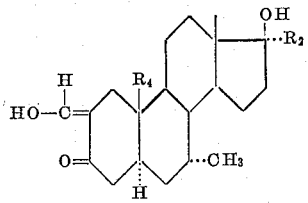

or an ester thereof is reacted with an $R_1$-hydrazine (where $R_1$, $R_2$ and $R_4$ have the above meanings) and, if desired, a resulting ester or salt is converted into the free compound or a resulting free compound is esterified and/or converted into a salt thereof.

The reaction according to the present invention is carried out in the usual manner, advantageously in the presence of a solvent or diluent, for example of an alcohol, such as methanol or ethanol, of an ether such as diethyl ether, tetrahydrofuran or dioxane, or of a hydrocarbon such as benzene, in the presence or absence of a reaction accelerator or condensing agent, at room temperature or preferably with heating, and/or in an inert gas, for example nitrogen.

According to the desired final product it is possible to introduce in the resulting compounds further radicals or to modify or eliminate existing radicals by known methods. Thus, if desired, a product of the above formulae (where $R_1$ represents hydrogen) obtained by the present process may be N-alkylated in the known manner, for example by reaction with a lower alkyl halide or sulphate or by reductive alkylation. If desired, a resulting ester may be hydrolysed by known methods, for example by basic hydrolysis or by hydrogenolysis. A resulting $17\beta$-hydroxy compound can be esterified in the known manner, for example by reaction with a reactive functional derivative of an acid, such as an acid anhydride or chloride.

Depending on the reaction conditions and starting materials used in the final products are obtained in the free form or in the form of their salts which are likewise included in the present invention. The salts obtained may be, for example, basic, neutral, acid or mixed salts, also hemi-, mono-, sesqui or polyhydrates thereof. The salts of the final products can be converted into the free bases in the known manner, for example with the aid of alkalies or ion exchange resins. When the free bases are treated with organic or inorganic acids, more especially acids that are capable of forming therapeutically acceptable salts, they form salts. As such acids there may be mentioned, for example hydrohalic, sulfuric or phosphoric acids, nitric or perchloric acid and, in addition to the carboxylic and sulfonic acids listed above, also succinic, glycollic, lactic, malic, tartaric, citric, ascorbic, maleic, hydroxymaleic, pyruvic, para-aminobenzoic, anthranilic, para-hydroxybenzoic, salicyclic, para-aminosalicyclic or embonic acid, hydroxyethanesulfonic, ethylenesulfonic, halogenobenzenesulfonic or sulfanilic acid; methionine, tryptophan, lysine or arginine.

The aforementioned and also other salts of the new compounds, for example the picrates, may also be used for purifying a resulting base by converting the base into a salt thereof and liberating the base again from the salt. In view of the close relationship between the bases in the free form and in the form of their salts, whenever the free compounds are mentioned above or hereinafter, the corresponding salts are likewise concerned whenever this applies.

The invention includes also any modification of the present process in which an intermediate obtained at any stage of the process is used as starting material and any remaining steps are carried out or the process is discontinued at any stage thereof, or in which a starting material is formed under the reaction conditions.

The starting materials can be manufactured, for example in the following manner:

A $\Delta^4$-3-oxo-$7\alpha$-methyl-$17\alpha$-$R_2$-$17\beta$ - hydroxyandrostene or -19-norandrostene is converted by reduction with lithium or sodium in liquid ammonia into a 3-oxo-$7\alpha$-methyl-$17\alpha$-$R_2$-$17\beta$-hydroxy-$5\alpha$-androstane or -19-nor-androstane. Alternatively, the latter product can be prepared in the known manner by introducing a lower aliphatic hydrocarbon radical into the $17\alpha$-position of 3:17-dioxo-$7\alpha$-methyl-$5\alpha$-androstane or -19-nor-androstane, optionally with transient protection of the 3-oxo group. To convert these compounds into the starting materials they are reacted with a formic acid ester, for example ethyl formate, in the presence of a basic agent, for example sodium hydride, in an inert solvent such as benzene, whereupon a resulting salt and/or ester is converted into the free compound or a free compound is esterified.

The new compounds may be used as medicaments, for example in the form of pharmaceutical preparations containing them or their salts in admixture or conjunction with an organic or inorganic, solid or liquid pharmaceutical excipient suitable for enteral, parenteral or local administration. Suitable excipients are substances that do not react with the new compounds, for example water, gelatine, lactose, starches, magnesium stearate, talcum, vegetable oils, benzyl alcohols, gums, polyalkylene-glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or contain assistants such as preservatives, stabilizers, wetting agents or emulsifiers, salts for regulating the osmotic pressure of buffers. They may also contain further, pharmaceutically valuable substances. The preparations, which may also be used in veterinary medicine, are formulated in the usual manner.

The following examples illustrate the invention without restricting its scope thereto.

*Example 1*

A solution of 1 g. of 2-hydroxymethylene-3-oxo-7α:17α-dimethyl-17β-hydroxy-5α-androstane in 20 ml. of methanol is mixed with 0.5 ml. of hydrazine hydrate, and the whole is refluxed for 5 hours under nitrogen. The cooled solution is then filtered off the crystalline precipitate. The residue is then dissolved in a mixture of ether, methylene chloride and methanol, and the solution is washed neutral with water, dried and evaporated in a water-jet vacuum. One recrystallization of the resulting crude product from methylene chloride+methanol yields 700 mg. of pure 7α:17α - dimethyl - 17β - hydroxy - 5α - androstano-[3,2-c]-pyrazole melting at 266–270° C. (which crystallises with 1 mol of methanol). When the filtrate referred to above is precipitated with water, extracted with methylene chloride+ether, worked up and finally allowed to crystallise, there are obtained another 187 mg. of the identical product. Infrared spectrum: bands inter alia at 2.81, 9.23, 9.82, 10.52 and 10.73μ. $\lambda_{max}$=266 mμ ($\epsilon$=4800, in ethanol).

The hydroxymethylene compound used as starting material can be prepared in the following manner:

A solution of 2.0 g. of 3-oxo-7α:17α-dimethyl-17β-hydroxy-5α-androstane in 80 ml. of absolute benzene is mixed with 4.5 ml. of ethyl formate and 2.5 g. of a 50% suspension of sodium hydride in oil, and the whole is stirred for 15 hours under nitrogen. The precipitated sodium salt is filtered off and washed exhaustively with ether. The dry, yellow compound is then vigorously shaken in a separating funnel with 100 ml. of 2 N-hydrochloric acid and 300 ml. of ether with addition of about 50 g. of ice; the liberated hydroxymethylene compound gradually dissolves in the ether. The organic layer is successively washed with water, with a mixture of 30 ml. of saturated sodium bicarbonate solution and 170 ml. of ice water and twice more with water. The ethereal solution is dried with sodium sulphate and evaporated in a water-jet vacuum, to yield 2.1 g. of a yellowish foam which, on recrystallisation from methylene chloride+ether, furnishes 1.28 g. of pure 2-hydroxymethylene-3-oxo-7α:17α-dimethyl-17β-hydroxy-5α-androstane melting at 160–162° C. (When a specimen of the product is rapidly heated in a melting-point apparatus, it melts at 134–136° C., then solidifies and melts once more at 158–160° C.) Infrared spectrum: bands inter alia at 2.81, 6.10, 6.28, 8.40, 8.70, 9.00, 10.35 and 10.68μ. $\lambda_{max}$=316 mμ ($\epsilon$=17,500; solvent: ethanol+sodium hydroxide solution). Ferric chloride test: positive.

*Example 2*

A solution of 1.50 g. of 2-hydroxymethylene-3-oxo-7α:17α-dimethyl-17β-hydroxy-5α-19-norandrostane in 40 ml. of methanol is mixed with 1.0 ml. of hydrazine hydrate, and the whole is refluxed for 10 hours under nitrogen. The solution is concentrated to about half its volume in a water-jet vacuum and allowed to stand for 2 hours at 0° C. The precipitated product is filtered off, washed with ether and recrystallized from methylene chloride+methanol. There are obtained 1.15 g. of pure 7α:17α - dimethyl - 17β - hydroxy - 5α - 19 - norandrostano-[3,2-c]-pyrazole which exhibits in the U.V.-spectrum an absorption bound at 225 mμ ($\epsilon$=5,000).

In case there is used instead of hydrazine hydrate the same amount of methyl-hydrazine there is obtained in about the same yield a mixture of the two isomeric N-methyl-pyrazoles which displays in the I.R.-spectrum bands at 2.85, 3.43, 9.24, 9.80 and 10.75μ.

What is claimed is:

1. A member selected from the group consisting of androstano-pyrazoles having the formulae

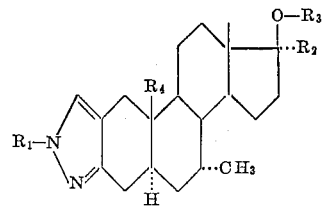

and

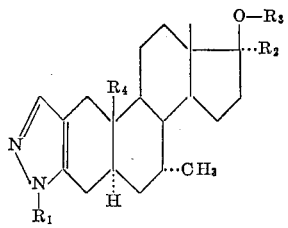

in which $R_1$ represents a member selected from the group consisting of hydrogen, and lower alkyl, $R_2$ represents lower alkyl, $R_3$ represents a member selected from the group consisting of hydrogen, the acyl group of a carboxylic acid with up to 18 carbon atoms and the acyl group of a sulfonic acid with up to 18 carbon atoms, and $R_4$ represents methyl, and acid addition salts thereof.

2. A member selected from the group consisting of 7α-methyl - 17α - lower alkyl - 17β - hydroxy - 5α - androstano-[3,2-c]-pyrazole, the esters thereof derived from a member selected from the group consisting of a carboxylic acid with up to 18 carbon atoms and a sulfonic acid with up to 18 carbon atoms and the therapeutically acceptable acid addition salts thereof.

3. 7α:17α - dimethyl - 17β - hydroxy - 5α - androstano-[3,2-c]-pyrazole.

References Cited by the Examiner

Clinton et al.: "Journal American Chem. Soc." vol. 83 (1961), pp. 1478–1491 relied on.

LEWIS GOTTS, *Primary Examiner.*

ELBERT L. ROBERTS, *Examiner.*